United States Patent [19]

Antonelli et al.

[11] Patent Number: 6,020,069
[45] Date of Patent: Feb. 1, 2000

[54] CATHODIC ELECTROCOATING COMPOSITION CONTAINING AN EPOXY RESIN CHAIN EXTENDED WITH A PRIMARY AMINE

[75] Inventors: Joseph A. Antonelli, Jupiter, Fla.; Christopher Scopazzi, Wilmington, Del.

[73] Assignee: E. I. du Pont de Nemours and Company, Wilmington, Del.

[21] Appl. No.: 09/099,541

[22] Filed: Jun. 18, 1998

[51] Int. Cl.$^7$ ................................................. B32B 27/38
[52] U.S. Cl. .......................... 428/413; 204/502; 204/504; 204/505; 523/451; 523/417; 525/528; 528/111; 528/120; 528/124
[58] Field of Search ................................. 204/502, 504, 204/505; 428/413; 523/415, 417; 525/528; 528/111, 120, 124

[56] References Cited

U.S. PATENT DOCUMENTS

| | | | |
|---|---|---|---|
| 3,922,253 | 11/1975 | Jerabek et al. | 260/77.5 TB |
| 3,925,180 | 12/1975 | Jerabek | 204/181 |
| 3,947,339 | 3/1976 | Jerabek et al. | 204/181 |
| 3,984,299 | 10/1976 | Jerabek | 204/181 |
| 4,017,438 | 4/1977 | Jerabek et al. | 260/29.2 EP |
| 4,031,050 | 6/1977 | Jerabek | 260/29.2 TN |
| 4,134,864 | 1/1979 | Belanger | 360/18 EP |
| 4,137,140 | 1/1979 | Belanger | 204/181 |
| 4,139,510 | 2/1979 | Anderson | 260/18 N |
| 4,148,772 | 4/1979 | Marchetti et al. | 260/29.2 EP |
| 4,167,499 | 9/1979 | Hazan | 260/21 |
| 4,177,124 | 12/1979 | Hazan | 204/181 |
| 4,246,089 | 1/1981 | Hazan | 204/181 |
| 4,256,621 | 3/1981 | Shimokai et al. | 260/29.7 NR |
| 4,274,989 | 6/1981 | Tominaga et al. | 260/29.2 TN |
| 4,287,041 | 9/1981 | Tominaga et al. | 204/181 |
| 4,293,398 | 10/1981 | Prucnal | 204/181 C |
| 4,296,010 | 10/1981 | Tominaga | 260/29.2 TN |
| 4,335,028 | 6/1982 | Ting et al. | 524/504 |
| 4,405,662 | 9/1983 | Baudenbusch et al. | 427/386 |
| 4,419,467 | 12/1983 | Wismer et al. | 523/414 |
| 4,423,168 | 12/1983 | Valko | 523/414 |
| 4,468,307 | 8/1984 | Wismer et al. | 204/181 |
| 4,484,994 | 11/1984 | Jacobs, III et al. | 204/181 |
| 4,536,558 | 8/1985 | Kordomenos | 528/100 |
| 4,542,193 | 9/1985 | Schupp et al. | 525/490 |
| 4,548,965 | 10/1985 | Geist et al. | 523/456 |
| 4,594,136 | 6/1986 | Schupp et al. | 204/181.7 |
| 4,596,842 | 6/1986 | Chung et al. | 523/414 |
| 4,608,405 | 8/1986 | DeGooyer | 523/404 |
| 4,609,446 | 9/1986 | Geist et al. | 204/181.7 |
| 4,617,348 | 10/1986 | Dickie et al. | 525/112 |
| 4,619,977 | 10/1986 | Qaderi | 525/502 |
| 4,659,800 | 4/1987 | Daimer et al. | 528/103 |
| 4,687,812 | 8/1987 | Dickie et al. | 525/111 |
| 4,719,253 | 1/1988 | Turpin et al. | 523/403 |
| 4,720,523 | 1/1988 | Dickie et al. | 525/113 |
| 4,727,098 | 2/1988 | Paar et al. | 523/414 |
| 4,824,925 | 4/1989 | Kamarchik, Jr. et al. | 528/45 |
| 4,829,104 | 5/1989 | McIntyre et al. | 523/403 |
| 4,846,946 | 7/1989 | Mauer et al. | 204/181.4 |
| 4,857,567 | 8/1989 | Laugal et al. | 523/415 |
| 4,872,961 | 10/1989 | McIntyre et al. | 204/181.7 |
| 4,879,013 | 11/1989 | Austin | 204/180.2 |
| 4,883,572 | 11/1989 | Rao et al. | 204/181 F |
| 4,892,897 | 1/1990 | Redman | 523/404 |
| 4,944,855 | 7/1990 | Schon et al. | 204/181.7 |
| 4,946,569 | 8/1990 | McIntyre et al. | 204/181.7 |
| 4,992,516 | 2/1991 | Schipfer et al. | 525/526 |
| 5,021,470 | 6/1991 | Laugal et al. | 523/414 |
| 5,026,743 | 6/1991 | Beresford et al. | 523/404 |
| 5,034,434 | 7/1991 | Beresford et al. | 523/404 |
| 5,064,880 | 11/1991 | Rao et al. | 523/403 |
| 5,070,149 | 12/1991 | DeBroy et al. | 525/296 |
| 5,089,542 | 2/1992 | Nishida et al. | 523/410 |
| 5,091,446 | 2/1992 | Nishida et al. | 523/404 |
| 5,132,378 | 7/1992 | Schipfer et al. | 525/526 |
| 5,139,631 | 8/1992 | Mishida et al. | 204/181.7 |
| 5,147,906 | 9/1992 | Nishida et al. | 523/410 |
| 5,158,995 | 10/1992 | Nishida et al. | 523/410 |
| 5,194,560 | 3/1993 | Langal et al. | 528/97 |
| 5,206,274 | 4/1993 | Rao et al. | 523/404 |
| 5,260,335 | 11/1993 | Wagner et al. | 514/532 |
| 5,276,072 | 1/1994 | Ishii et al. | 523/415 |
| 5,281,316 | 1/1994 | Chung et al. | 204/181.7 |
| 5,312,879 | 5/1994 | Rao et al. | 525/526 |
| 5,314,594 | 5/1994 | Chung et al. | 204/181.4 |
| 5,348,635 | 9/1994 | Langal et al. | 204/181.7 |
| 5,382,607 | 1/1995 | Sikora et al. | 523/415 |
| 5,389,705 | 2/1995 | Huemke et al. | 523/417 |
| 5,416,137 | 5/1995 | Turnquist et al. | 523/415 |
| 5,446,077 | 8/1995 | Yamada et al. | 523/415 |
| 5,447,973 | 9/1995 | Yamada et al. | 523/415 |
| 5,472,998 | 12/1995 | Tessmer et al. | 523/404 |
| 5,525,666 | 6/1996 | Hoenel et al. | 524/458 |
| 5,667,894 | 9/1997 | Antonelli et al. | 428/413 |

Primary Examiner—Robert Dawson
Assistant Examiner—Jeffrey B. Robertson
Attorney, Agent, or Firm—Hilmar L. Fricke; Steven C. Benjamin

[57] ABSTRACT

An improved aqueous cathodic electrocoating composition of an aqueous carrier having dispersed therein a film forming binder of (1) an epoxy-resin amine adduct and (2) a blocked polyisocyanate crosslinking agent; wherein the improvement is an epoxy resin amine adduct which is a reaction product of an epoxy resin and a polyhydric phenol which is chain extended with a primary amine to form a chain extended epoxy resin having epoxy end groups and an equivalent amine to epoxy ratio is 1–10 to 4–10 and wherein the epoxy end groups of the resin are reacted with a ketimine and/or a diamine and the resulting chain extended epoxy resin has an epoxy equivalent weight of about 700–2,000 and is neutralized with an organic or inorganic acid; wherein the electrocoating composition has improved throw power and forms coatings that have improved corrosion resistance in comparison to conventional electrocoating compositions formed from epoxy resins extended with conventional diamines or polyols.

13 Claims, No Drawings

CATHODIC ELECTROCOATING COMPOSITION CONTAINING AN EPOXY RESIN CHAIN EXTENDED WITH A PRIMARY AMINE

BACKGROUND OF THE INVENTION

This invention is directed to a cathodic electrocoating composition and in particular to a cathodic electrocoating composition containing an epoxy hydroxy polyether resin extended with a primary amine that forms a high quality, stable electrocoating composition.

The coating of electrically conductive substrates by an electrodeposition process also called an electrocoating process is a well known and important industrial process. Electrodeposition of primers to automotive substrates is widely used in the automotive industry. In this process, a conductive article, such as an auto body or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired thickness of coating is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

The resins used in cathodic electrocoating compositions typically are based on epoxy resins reacted with a dihydric phenol such as bis phenol A which is then chain extended with a polyol and then capped with an amine and reacted with an acid to form a water dispersible or soluble cathodic polymer. With this procedure there is a limit on polymer molecular weight. If the molecular weight is too high, there is an insufficient amount of amine that can be incorporated into the polymer to make it water dispersible. The latter problem can be resolved by chain extending with a diamine. However, gelation problems can occur if the ratio of amine to epoxy groups is not maintained with in an optimum range.

Gelation problems do not occur with the present invention in which the epoxy resin reacted with dihydric phenol is extended with a primary amine and then capped with an amine. The resulting resin or polymer has a sufficient number of amine groups to form a water dispersible polymer even at high molecular weights and allows for the preparation of polymers with a broad range of molecular weights. Electrocoating compositions of these polymers have a wide range of application voltages, improved throw power and wedge performance in conventional cathodic electrocoating baths. If an alkanol amine is used, the resin will have additional hydroxyl groups along the polymer chain which will enhance the crosslinked structure of a resulting coating of the composition.

Throw power of an electrocoating composition is the degree to which an electrodeposited film penetrates and coats the surfaces of recessed interior areas of an automobile or truck body. Electrodeposition of coatings follows the force lines of the electrical field that exists in an electrocoating bath between the cathode and the anode. These force lines diminish as they penetrate into the recessed areas of the auto or truck body and cease to exist when the recessed area is too deep and a coating will not be deposited into such an area.

As automobile and truck body designs change, there is an increased need for electrocoating composition that have increased throw power and that will penetrate and coat recessed areas and there is a continued need for electrocoating compositions that provide improved corrosion resistance. The improved electrocoating composition of this invention has increased throwing power and provides a film having improved corrosion along with other desirable characteristics such as solvent, and chip resistance.

SUMMARY OF THE INVENTION

An improved aqueous cathodic electrocoating composition of an aqueous carrier having dispersed therein a film forming binder of (1) an epoxy-resin amine adduct and (2) a blocked polyisocyanate crosslinking agent; wherein the improvement is an epoxy resin amine adduct which is a reaction product of an epoxy resin and a polyhydric phenol which is chain extended with a primary amine to form a chain extended epoxy resin having epoxy end groups and having an equivalent amine to epoxy ratio of 1–10 to 4–10 and wherein the epoxy end groups of the resin are reacted with a ketimine and/or a diamine and the resulting chain extended epoxy resin has an epoxy equivalent weight of about 700–2,000 and is neutralized with an organic or inorganic acid; wherein the electrocoating composition has improved throw power and forms coatings that have improved corrosion resistance in comparison to conventional electrocoating compositions formed from epoxy resins extended with diamines or polyols.

DETAILED DESCRIPTION OF THE INVENTION

The film forming binder used to form the cathodic electrocoating composition of this invention is an epoxy resin amine adduct and a blocked polyisocyanate crosslinking agent. The epoxy resin amine adduct is formed from an epoxy resin which is chain extended with a polyhydric phenol and then further chain extended with a primary amine and reacted or capped with a secondary amine or diketimine to provide an adduct with amine groups that are subsequently neutralized with an acid. The epoxy resin amine adduct usually is blended with a blocked polyisocyanate and then neutralized with an acid such as an alkane sulfonic acid and inverted into water to form an aqueous emulsion. Other ingredients are then added such as pigment in the form of a pigment paste, anticrater agent, flexibilizers, defoamers, wetting agents and the like to form a commercial electrocoating composition. Typical aqueous cationic electrocoating compositions are shown in DebRoy et al U.S. Pat. No. 5,070,149 issued Dec. 3, 1991 30 and the aforementioned U.S. Pat. Nos. 3,922,253; 4,419,467; 4,137,140 and 4,468,307.

The advantages of the electrocoating composition of this invention is that there are sufficient amine groups on the chain extended epoxy resin to form a water dispersible resin even at high molecular weights and allows for the preparation of resins or polymers with a broad molecular weight range that are useful for electrocoating. If an alkanol amine is used, the polymer will also have hydroxyl groups present which will crosslink with the isocyanate crosslinking agent on curing of the composition after electrodeposition. The electrocoating composition has improved throw power and wedge performance in comparison to conventional electrocoating compositions that have been chain extended with polyols or diamines.

A typical electrocoating composition is an aqueous composition having a solids content of about 5–50% by weight of a binder of the principal emulsion of a cathodic film forming epoxy amine adduct, blocked polyisocyanate crosslinking agent, additives, pigment dispersant resins, pigments and the like and usually contains an organic coalescing solvent.

The binder of the electrocoating composition typically contains about 20–80% by weight of the epoxy amine adduct and correspondingly 80–20% of the blocked isocyanate.

The epoxy resin used in the epoxy amine adduct is a poly epoxy hydroxy ether resin having an epoxy equivalent weight of about 100–2000.

Epoxy equivalent weight is the weight of resin in grams which contains one gram equivalent of epoxy.

These epoxy resins can be any epoxy hydroxy containing polymer having a 1,2 epoxy equivalency of two or more epoxy groups per molecule. The preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1 -bis-(4-hydroxyphenyl) propane, 2,2-bis-(4-hydroxy-3-tertiarybutylphenyl)propane, 1,1-bis-(4-hydroxyphenol) ethane, bis-(2-hydroxynaphthyl)methane, 1,5-dihydroxy-3-naphthalene or the like.

Examples of preferred commercial epoxy resins are Epon 828®, Epon 1001®, Epon 1001F®, Epon 1002F®, Epon 1004F®. Most preferred are Epon 828 ® and Epon1001F® since these resins form high quality products. About 1–15% by weight, based on the weight of the epoxy resin of a multifunctional epoxy resin (more than two epoxy groups) can be used.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis (hydroxymethyl)cyclohexane, 1,3-bis-(hydroxymethyl) cyclohexane, 1,2 cyclohexane diol, 1,4 cyclohexane diol and hydrogenated bisphenol A.

The epoxy resin can be chain extended with any of the aforementioned polyhydric phenols to give an epoxy resin having an epoxy equivalent weight of about 500–1,500. Preferred chain extenders are bisphenol A, polyether or a polyester polyols which enhances flow and coalescence. Typical useful polyol chain extenders are polycaprolactone diols such as Tone 200® series available from Union Carbide Corporation, polyoxypropylene diamine such as Jeffamine D-2000® having a molecular weight of about 2000 available from Texaco Chemical Company and ethyoxylated Bisphenol A such as SYNFAC 8009 ® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethyl benzyl amine and organometallic complexes such as triphenyl phosphonium iodide.

The epoxy resin is further chain extended with a primary amine such as an alkyl amine, alkanol amine or an aromatic amine. Typically useful alkyl amines are methyl amine, ethyl amine, propyl amine, butyl amine, isobutyl amine, pentyl amine, hexyl amine and the like. Typically useful alkanol amines are ethanol amine, methanol amine, propanol amine, butanol amine, isobutanol amine, ter. butanol amine, hexanol amine, 2-amino 2-ethyl 1,3-propane diol, 2-amino 2-ethyl 1-propanol. A typically useful aromatic amine is benzyl amine. The epoxy equivalent weight of the resulting amine chain extended resin is 700–2,000.

Ketimines and/or secondary amines are used to cap i.e., react with, the epoxy end groups of the resin to form the epoxy amine adduct. Ketimines are formed by reacting ketones with primary amines. Water formed in the reaction is removed, for example, by azeotropic distillation. Useful ketones include dialkyl, diaryl and alkylaryl ketones having 3–13 carbons atoms. Specific examples of ketones used to form these ketimines include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9-dioxadodecone, 1,12-diamine and the like. One typically useful ketimine is diketimine which is the ketimine of diethylene triamine and methyl isobutyl ketone. Typically useful secondary amines that can be used are diethyl amine, methyl ethyl amine, methyl ethanol amine, ethyl ethanol amine, dimethyl amine, diethyl amine, dipropyl amine, diisopropyl amine, dibutyl amine and the like.

The polyisocyanate crosslinking agents that are used are well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. Methylene diphenyl diisocyanate is preferred. These isocyanates are pre-reacted with a blocking agent such as oximes, alcohols, or caprolactams which block the isocyanate functionality.

One preferred mixture of blocking agents is methanol, ethanol and diethylene glycol monobutyl ether. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The electrocoating composition can contain 1–40% by weight, based on the weight of the film forming binder of a hydroxy functional flexibilizer resin having weight average molecular weight of 500–1500. For most electrocoating compositions to form a high quality product, it is preferred to use about 2–10% by weight of the flexibilizer resin and more preferably about 5%. One useful flexibilizer resin is polytetrahydrofuran having a molecular weight of 500–1000.

Typical acids that can be used to neutralize the epoxy amine adduct to form water dispersible cationic groups are lactic acid, acetic acid, formic acid, sulfamic acid and alkane sulfonic acids. The resulting electrocoating composition preferably has a pH of about 5.5–7.

An alkane sulfonic acid as the neutralizing agent is preferred since it provides an electrocoating composition that has improved throw power, lower application voltages, improved film thickness in recessed areas and smaller dispersed binder particles in the composition. Typically useful alkane sulfonic acids are methane sulfonic acid, ethane sulfonic acid, propane sulfonic acid and the like with methane sulfonic being most preferred because of its relatively low cost and availability. Substituted alkane sulfonic acids also can be used as a neutralizing agent and provide results that are similar to alkane sulfonic acids; typically useful substituted acids are hydroxy ethane sulfonic acid and hydroxy propane sulfonic acid.

The electrocoating composition usually contains pigments which are incorporated into the composition in the form of a pigment paste. The pigment paste is prepared by grinding or dispersing a pigment into a grinding vehicle or resin and optional ingredients such as wetting agents, surfactants, and defoamers. Any of the pigment grinding vehicles that are well known in the art can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, zinc hydroxy phosphite, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The electrocoating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of the binder of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight of the binder of the composition.

The electrocoating composition of this invention is an aqueous dispersion. The term "dispersion" as used within the context of this invention is a two-phase translucent or opaque aqueous resinous binder system in which the binder is in the dispersed phase and water the continuous phase. The average particle size diameter of the binder phase is about 0.02 to 10 microns, preferably, less than 1 micron. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The electrocoating composition of this invention is used in a conventional cathodic electrocoating process. The electrocoating tank contains two electrically conductive electrodes; the anode which is part of the electrocoating tank and the cathode which is the object that is to be coated such as an auto body or auto part. An adherent film is deposited on the cathode when a sufficient voltage is impressed between the two electrodes. The voltages that are applied may be varied depending on the type of coating and on coating thickness and throw power required and may be as low as 1 volt or as high as several thousand volts. Typical voltages used are between about 50–500 volts. The current density usually is between 0.5 and 5 amperes per square foot and decreases during electrodeposition indicating that an insulating film is being deposited. A variety of substrates can be electrocoated with the composition of this invention such as steel, phosphatized steel, galvanized steel, copper, aluminum, magnesium and various plastics coated with an electrically conductive coating.

After the coating has been electrocoated, it is cured by baking at elevated temperatures such as 90–160° C. for about 1–40 minutes.

The electrocoating composition of this invention which preferably has been neutralized with an alkane sulfonic acid forms a stable dispersion and surprisingly has good throw power and has improved wedge in comparison to electrocoating compositions that have been chain extended with polyols or diamines. Wedge is the distance from a counter electrode a film 0.5 mils thick is coated at a given voltage. Tests to determine throw power and wedge are described in the following example.

The following example illustrates the invention. All parts and percentages are on a weight basis unless otherwise indicated.

EXAMPLE 1

Preparation of a Polyepoxide Resin Solution A

A polyepoxide resin solution was prepared by charging the following constituents into a suitable reaction vessel equipped with a nitrogen inlet, a stirrer and a heating source:

|  | Parts by Weight |
|---|---|
| Portion 1 | |
| EPON 828 ® (diglycidyl ether of bisphenol A having an epoxy equivalent weight of 188) | 1220.8 |
| Bisphenol A | 370.1 |
| Xylene | 83.7 |
| Portion 2 | |
| N,N-dimethyl benzyl amine | 0.81 |
| Portion 3 | |
| Ethanol amine | 49.5 |
| Portion 4 | |
| Blocked isocyanate crosslinker solution (75% solids solution PAPI 2027 polymeric diphenylmethane diisocyanate from Dow Chemical blocked with methanol, ethanol and Butyl Cellosolve) | 1312.3 |
| Terathane 650 (from DuPont) | 131.2 |
| Portion 5 | |
| Methyl ethanol amine | 97.4 |
| Diketimine of methyl isobutyl ketone and diethylene diamine | 115.6 |

| | Parts by Weight |
|---|---|
| Portion 6 | |
| Blocked isocyanate crosslinker solution (described above) | 196.9 |
| "Terathane" 650 | 65.6 |
| "Synfac" 8334 (nonionic surfactant from Millliken Chemicals) | 48.1 |
| Methyl ethyl ketone | 881.3 |
| Total | 4,573.31 |

Portion 1 was charged into the reaction vessel and under agitation was heated to 145° C. Portion 2 was added and the temperature raised to 160–170° C. and held at this temperature for about 1 hour. The epoxy equivalent weight at this stage was 490. The reaction mixture was cooled to 145° C. Portion 3 was added over a 15 minute period and the reaction mixture was held at 145–150° C. for 45 minutes. The epoxy equivalent weight was 1100. The reaction mixture was cooled to 120° C. and Portion 4 was added. Portion 5 was added in the order shown and the reaction mixture was held at 120° C. for 60 minutes. Portion 6 was added and the reaction mixture was cooled to room temperature.

Preparation of an Aqueous Emulsion

To a vessel equipped as above the following constituents were added: 1591.2 parts of the Polyepoxide Resin Solution A, prepared above, 453.8 part of a 10% solution of methane sulfonic acid and the constituents were thoroughly mixed together. 267.4 parts of deionized water and 18.4 parts of PN-3901 surfactant blend (PPG) were added and the resulting mixture was agitated for about 10 minutes. 1962.1 parts of deionized water was added over a 30 minute period with constant agitation. The temperature of the mixture was held at 50° C. for 12–24 hour to remove 793 parts organic solvent. The resulting emulsion had a 33% solids content and a particle size of about 66 nanometers measured by a Coulter Scientific Instruments Model LS150 Automated Laser Based Particle Size Analyzer.

Preparation of Pigment Grinding Vehicle

The pigment grinding vehicle was prepared by charging 750 parts imidazoline amine described in Example 1 of U.S. Pat. No. 5,128,393 into a suitable reaction vessel under nitrogen blanket and heated to about 66° C. 812 parts of DY025 of the formula:

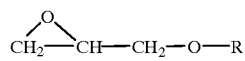

where R is a $C_{12}$–$C_{14}$ alkyl group, were added to the reaction vessel at such a rate that the reaction temperature was maintained at about 93° C. The reaction mixture was held at 93° C. until the DY025 was added and the epoxy equivalent weight was essentially infinite. The resulting product had a solids content of about 80%, a Gardner-Holdt viscosity of V-Y measured at about 20° C. and an amine equivalent weight of 291.6 at 100% solids. To neutralize the product 497 parts of an aqueous lactic acid solution (88% aqueous solution) was added to 776 parts of the product and heated to about 38° C., The exothermic neutralization reaction raised the temperature to about 52° C. The resulting reaction mixture was reduced with 440 parts of 2-butoxyethanol to about 80% solids.

| | Parts by Weight |
|---|---|
| Pigment Grinding Vehicle (prepared above) | 116.6 |
| Foammaster 111 (antifoam agent) | 3.8 |
| Deionized Water | 415.0 |
| Titanium Dioxide Pigment | 267.0 |
| Aluminum Silicate Pigment | 53.0 |
| Lead Silicate Pigment | 23.0 |
| Carbon Black Pigment | 8.0 |
| Dibutyl Tin Oxide | 31.0 |
| Total | 917.4 |

The above ingredients were mixed until homogenous in a suitable mixing container. They were then dispersed in a sandmill until a Hegman reading of seven or greater is obtained. The nonvolatile content of the paste is 50%.

Preparation of Electrocoating Bath A

| | Parts by Weight |
|---|---|
| Aqueous Emulsion (prepared above) | 3121.4 |
| Anti crater additive | 172.5 |
| Silane anti crater additive | 100.8 |
| Deionized water | 1633.9 |
| Pigment paste (prepared above) | 782.4 |
| Deionized water | 1749.0 |
| Total | 7560.0 |

Electrocoating Bath A was prepared by mixing the aqueous emulsion with the anti crater additive and the silane anti crater additive and mixing was continued for 10 minutes. Deionized water and pigment paste were added and mixed for 15 minutes and then the mixture was diluted with deionized water. The bath has a pH of 5.5 and a conductivity of 2150 microsiemens (measured with a Yellow Springs Inc. USI Model 35 Conductivity Meter). Electrocoating tests were conducted on the bath as described following the examples and the results of these test are shown in the table following the examples.

EXAMPLE 2

A Polyepoxy Resin Solution B was prepared by charging the following constituents into a reaction vessel equipped as in Example 1: 1218.8 g "Epon" 828 epoxy resin (Shell), 369.5 g bisphenol A and 83.6 g xylene and the batch agitated and heated to 145° C. At this time 0.80 g N,N-dimethyl benzyl amine was added and the temperature raised to 160–170° C. and held for 1 hour. The weight per epoxy at this stage was 1184. The batch was cooled to 145° C. and 59.3 g of ethanol amine was then charged over 15 minutes after which the reaction mixture was held at 145–150° C. for 45 minutes and the weight per epoxy rose to 1423. The batch was cooled to 120° C. and 1318.1 g of blocked isocyanate crosslinker and 131.8 g "Terathane" 650 (DuPont) added. This was followed by the addition, in order, of 138.5 g of the diketimine of methyl isobutyl ketone and diethylene diamine and 68.1 g of methyl ethanol amine. The reaction mixture was then held at 120° C. for 60 minutes and was followed by the addition of 395.4 g blocked isocyanate crosslinker, 131.8 g "Terathane" 650, 48.3 g "Synfac" 8334 and 916.9 g methyl ethyl ketone. The batch was then cooled to room temperature.

Preparation of Emulsion B

The following constituents were added to a mixing vessel: 1605.1 g of Polyepoxy Resin Solution B (prepared above)

and 385.2 g of a 10% solution of methane sulfonic acid with agitation. This was followed by the addition of a mixture of 269.7 g deionized water and 18.4 g PN-3901 surfactant blend (PPG) and the mixture agitated for 10 minutes. 1979.2 g of deionized water was then added over 30 minutes with agitation after which the batch temperature was raised to 50° C. and the mixture agitated for 12 to 24 hours to remove 757.7 g of solvent. Particle size of the emulsion is 48 nanometers.

Preparation of Electrocoating Bath B 3121.4 g of the Emulsion B was added to a 2 gallon pail and 172.5 g of anti-crater additive and 100.8 g silane anti-crater additive were added with agitation. The mixture was agitated for 10 minutes followed by the addition of 1633.9 g water and 782.4 g pigment paste (prepared in Example 1). This mixture was agitated for 15 minutes and then thinned with 1749.0 g water. The paint has a pH of 5.6 and a conductivity of 1850 microsiemens. Electrocoating tests were done as in Example 1 and the results are shown in the table following the Examples.

EXAMPLE 3

A Polyepoxy Resin Solution C was prepared by charging the following constituents into a reaction vessel equipped as in Example 1: 1197.3 g "Epon" 828 epoxy resin (Shell), 363.0 g bisphenol A and 82.1 g xylene and the batch agitated and heated to 145° C. At this time 0.80 g N,N-dimethyl benzyl amine was added and the temperature raised to 160–170° C. and held for 1 hour. The weight per epoxy at this stage was 500. The batch was cooled to 145° C. and 38.9 g of ethanol amine was then charged over 15 minutes after which the reaction mixture was held at 145–150° C. for 45 minutes and the weight per epoxy rose to 856. The batch was cooled to 120° C. and 1279.4 g of blocked isocyanate crosslinker and 127.9 g "Terathane" 650 (DuPont) added. This was followed by the addition, in order, of 204.1 g of the diketimine of methyl isobutyl ketone and diethylene diamine and 100.3 g of methyl ethanol amine. The reaction mixture was then held at 120° C. for 60 mintues and was followed by the addition of 46.9 g "Synfac" 8334 and 826.3 g methyl ethyl ketone. The batch was then cooled to room temperature.

Preparation of Emulsion C

The following constituents were added to a mixing vessel: 1608.8 g of Polyepoxy Resin Solution C (prepared above) and 535.4 g of a 10% solution of methane sulfonic acid with agitation. This was followed by the addition of a mixture of 270.4 g deionized water and 18.6 g PN-3901 surfactant blend (PPG) and the mixture agitated for 10 minutes. 1983.3 g of deionized water was then added over 30 minutes with agitation after which the batch temperature was raised to 50° C. and the mixture agitated for 12 to 24 hours to remove 916.9 g of solvent. Particle size of the emulsion is 72 nanometers.

Preparation of Electrocoating Bath C 3121.4 g of the Emulsion C was added to a 2 gallon pail and 172.5 g of anti-crater additive and 100.8 g silane anti-crater additive were added with agitation. This mixture was agitated for 10 minutes followed by the addition of 1633.9 g water and 782.4 g pigment paste (prepared in Example 1). This mixture was agitated for 15 minutes and then thinned with 1749.0 g water. The paint has a pH of 6.0 and a conductivity of 2680 microsiemens. Electrocoating tests were done as in Example 1 and the results are shown in the table following the Examples.

EXAMPLE 4

A Polyepoxy Resin Solution D was prepared by charging the following constituents into a reaction vessel equipped as in Example 1: 1197.3 g "Epon" 838 epoxy resin (Shell), 363.0 g bisphenol A and 82.1 g xylene and the batch agitated and heated to 145° C. At this time 0.80 g N,N-dimethyl benzyl amine was added and the temperature raised to 160–170° C. and held for 1 hour. The batch was cooled to 145° C. and 38.9 g of ethanol amine was then charged over 15 minutes after which the reaction mixture was held at 145–150° C. for 45 minutes. The batch was cooled to 120° C. and 1279.4 g of blocked isocyanate crosslinker and 127.9 g "Terathane" 650 (DuPont) added. This was followed by the addition, in order, of 204.1 g of the diketimine of methyl isobutyl ketone and diethylene diamine and 100.3 g of methyl ethanol amine. The reaction mixture was then held at 120° C. for 60 minutes followed by the addition of 383.8 g blocked isocyanate crosslinker, 127.9 g "Terathane" 650, 46.9 g "Synfac" 8334 and 908.5 g methyl ethyl ketone. The batch was then cooled to room temperature.

Preparation of Emulsion D

The following constituents were added to a mixing vessel: 1597.5 g of Polyepoxy Resin Solution D (prepared above) and 560.0 g of a 10% solution of methane sulfonic acid with agitation. This was followed by the addition of a mixture of 268.5 g deionized water and 18.5 g PN-3901 surfactant blend (PPG) and the mixture agitated for 10 minutes. 1970.0 g of deionized water was then added over 30 minutes with agitation after which the batch temperature was raised to 50° C. and the mixture agitated for 12 to 24 hours to remove 914.3 g of solvent. Particle size of the emulsion is 207 nanometers.

Preparation of Electrocoating Bath C 3121.4 g of the Emulsion D was added to a 2 gallon pail and 172.5 g of anti-crater additive and 100.8 g silane anti-crater additive were added with agitation. This mixture was agitated for 10 minutes followed by the addition of 1633.9 g water and 782.4 g pigment paste (prepared in Example 1). This mixture was agitated for 15 minutes and then thinned with 1749.0 g water. The paint has a pH of 6.0 and a conductivity of 2560 microsiemens. Electrocoating tests were done as in Example 1 and the results are shown in the table following the Examples.

EXAMPLE 5

Preparation of a Polyepoxide Resin Solution E

A polyepoxide resin solution was prepared by charging the following constituents into a suitable reaction vessel equipped with a nitrogen inlet, a stirrer and a heating source:

|  | Parts by Weight |
|---|---|
| Portion 1 | |
| EPON 828 ® (diglycidyl ether of bisphenol A having an epoxy equivalent weight of 188) | 1170.50 |
| Bisphenol A | 354.90 |
| Xylene | 80.30 |
| Portion 2 | |
| N,N-dimethyl benzyl amine | 0.81 |
| Portion 3 | |
| 2-Amino-2-ethyl 1,3-propane diol | 79.60 |
| Portion 4 | |
| Blocked isocyanate crosslinker solution (75% solids solution PAPI 2027 polymeric diphenylmethane diisocyanate from Dow Chemical blocked with methanol, ethanol and Butyl Cellosolve) | 1282.10 |

-continued

| | Parts by Weight |
|---|---|
| "Terathane" 650 (polytetrahydrofuran MW 650 from DuPont) | 128.20 |
| Portion 5 | |
| Diketimine of methyl isobutyl ketone and diethylene diamine | 199.50 |
| Methyl ethanol amine | 98.10 |
| Portion 6 | |
| "Terathane" 650 | 128.20 |
| "Synfac" 8334 | 46.90 |
| Methyl ethyl ketone | 881.30 |
| Total | 4450.41 |

Portion 1 was charged into the reaction vessel and under agitation was heated to 145° C. Portion 2 was added and the temperature raised to 160–170° C. and held at this temperature for about 1 hour. The reaction mixture was cooled to 145° C. The epoxy equivalent weight was 496. Portion 3 was added over a 15 minute period and the reaction mixture was held at 145–150° C. for 45 minutes. The epoxy equivalent weight at this stage was 878. The reaction mixture was cooled to 120° C. and Portion 4 was added. Portion 5 was added in the order shown and the reaction mixture was held at 120° C. for 60 minutes. Portion 6 was added and the reaction mixture was cooled to room temperature. acid.

Preparation of an Aqueous Emulsion E

To a vessel equipped as above the following constituents were added: 1601.9 parts of the resin solution, prepared above, 555.9 parts of a 10% solution of methane sulfonic acid and the constituents were thoroughly mixed together. 269.2 parts of deionized water and 18.5 parts of PN-3901 surfactant blend (PPG) were added and the resulting mixture was agitated for about 10 minutes. 1975.2 parts of deionized water was added over a 30 minute period with constant agitation. The temperature of the mixture was held at 50° C. for 12–24 hour to remove 920.6 parts organic solvent. The resulting emulsion had a 33% solids content and a particle size of about 44 nanometers measured as in Example 1.

Preparation of Electrocoating Bath E

| | Parts by Weight |
|---|---|
| Aqueous Emulsion (prepared above) | 3121.4 |
| Anti crater additive (described in Example 1) | 172.5 |
| Silane anti crater additive (described in Example 1) | 100.8 |
| Deionized water | 1633.9 |
| Pigment paste (prepared in Example 1) | 782.4 |
| Deionized water | 1749.0 |
| Total | 7560.0 |

Electrocoating Bath E was prepared by mixing the aqueous emulsion with the anti crater additive and the silane anti crater additive and mixing was continued for 10 minutes. Deionized water and pigment paste were added and mixed for 15 minutes and then the mixture was diluted with deionized water. The bath has a pH of 6.3 and a conductivity of 2150 microsiemens (measured with a Yellow Springs Inc. USI Model 35 Conductivity Meter. Electrocoating tests were conducted on the bath as described following the examples and the results of these test are shown in the table following the examples.

EXAMPLE 6

Preparation of Polyepoxide Resin Solution F

A polyepoxide resin solution was prepared by charging the following constituents into a suitable reaction vessel equipped with a nitrogen inlet, a stirrer and a heating source:

| | Parts by Weight |
|---|---|
| Portion 1 | |
| EPON 828 ® (diglycidyl ether of bisphenol A having an epoxy equivalent weight of 188) | 1202.9 |
| Bisphenol A | 364.7 |
| Xylene | 82.5 |
| Portion 2 | |
| N,N-dimethyl benzyl amine | 0.8 |
| Portion 3 | |
| Benzyl amine | 74.4 |
| Portion 4 | |
| Blocked isocyanate crosslinker solution (75% solids solution PAPI 2027 polymeric diphenylmethane diisocyanate from Dow Chemical blocked with methanol, ethanol and Butyl Cellosolve) | 1313.6 |
| Terathane 650 (from DuPont) | 131.4 |
| Portion 5 | |
| Diketimine of methyl isobutyl ketone and diethylene diamine) | 113.9 |
| Methyl ethanol amine | 96.0 |
| Portion 6 | |
| Blocked isocyanate crosslinker solution (described above) | 197.0 |
| Terathane 650 | 65.6 |
| "Synfac" 8334 (nonionic surfactant from Millliken Chemicals | 48.0 |
| Methyl ethyl ketone | 882.6 |
| Total | 4,573.4 |

Portion 1 was charged into the reaction vessel and under agitation was heated to 145° C. Portion 2 was added and the temperature raised to 160–170° C. and held at this temperature for about 1 hour. The reaction mixture was cooled to 145° C. Portion 3 was added over a 15 minute period and the reaction mixture was held at 145–150° C. for 45 minutes. The epoxy equivalent weight was 1047. The reaction mixture was cooled to 120° C. and Portion 4 was added. Portion 5 was added in the order shown and the reaction mixture was held at 120° C. for 60 minutes. Portion 6 was added and the reaction mixture was cooled to room temperature.

Preparation of an Aqueous Emulsion F

To a vessel equipped as above the following constituents were added: 1591.2 parts of the resin solution, prepared above, 447.2 parts of a 10% solution of methane sulfonic acid and the constituents were thoroughly mixed together. 267.5 parts of deionized water and 18.4 parts of PN-3901 surfactant blend (PPG) were added and the resulting mixture was agitated for about 10 minutes. 1962.1 parts of deionized water was added over a 30 minute period with constant agitation. The temperature of the mixture was held at 50° C. for 12–24 hour to remove 793 parts organic solvent. The resulting emulsion had a 33% solids content and a particle size of about 137 nanometers measured as in Example 1.

Preparation of Electrocoating Bath F

|  | Parts by Weight |
|---|---|
| Aqueous Emulsion (prepared above) | 3121.4 |
| Anti crater additive (described in Example 1) | 172.5 |
| Silane anti crater additive (described in Example 1) | 100.8 |
| Deionized water | 1633.9 |
| Pigment paste (prepared in Example 1) | 782.4 |
| Deionized water | 1749.0 |
| Total | 7560.0 |

Electrocoating Bath F was prepared by mixing the aqueous emulsion with the anti crater additive and the silane anti crater additive and mixing was continued for 10 minutes. Deionized water and pigment paste were added and mixed for 15 minutes and then the mixture was diluted with deionized water. The bath has a pH of 5.6 and a conductivity of 2080 microsiemens (measured as in Example 1)

ELECTRODEPOSITION RESULTS OF TESTS OF BATHS A–F

Zinc phosphate treated steel panels were electrocoated in each of the baths A–F. Electrocoating was performed according to Ford Laboratory Test Method MJ B1 20-20C. A box formed of two 12×4 inch phosphated steel panels was suspended vertically in the bath and electrocoated. Electrocoating is performed at 33° C. for 2 minutes at a number of voltages. The voltage to achieve 0.85 mils is then estimated and is defined as Vc. The throw and wedge at Vc are similarly determined. After being electrocoated the panels were separated and baked at 163° C. for 30 minutes. Film builds on the exterior of the panel that formed the box were measured The film thickness of the side of the panels that formed the interior of the box were measured every 10 millimeters from the bottom from which wedge and throw were determined. Wedge is defined as the distance in the interior of the box formed by the panels at which the film thickness is 0.5 mils and the throw is the distance at which the film thickness is zero. The results of these tests are as follows:

TABLE 1

|  | THROW POWER (mm) | WEDGE (mm) | Vc (volts) |
|---|---|---|---|
| BATH A (Example 1) | 204 | 48 | 225 |
| BATH B (Example 2) | 205 | 55 | 240 |
| BATH C (Example 3) | 219 | 40 | 240 |
| BATH D (Example 4) | 184 | 30 | 180 |
| BATH E (Example 5) | 206 | 30 | 200 |
| BATH F (Example 6) | 208 | 35 | 255 |

We claim:

1. An improved aqueous cathodic electrocoating composition of an aqueous carrier having dispersed therein a film forming binder of (1) an epoxy-resin amine adduct and (2) a blocked polyisocyanate crosslinking agent; wherein the improvement is an epoxy resin amine adduct comprising a reaction product of an epoxy resin and a polyhydric phenol which is chain extended with a primary amine to form a chain extended epoxy resin having epoxy end groups and an equivalent amine to epoxy ratio of 1–10 to 4–10 and wherein the epoxy end groups of the resin are reacted with a compound selected from the group consisting of ketimine, diamine and mixtures thereof and the resulting chain extended epoxy resin has an epoxy equivalent weight of about 700–2,000 and is neutralized with an organic or inorganic acid; wherein the electrocoating composition has improved throw power and forms coatings that have improved corrosion resistance.

2. The improved cathodic electrocoating composition of claim 1 in which the primary amine is an alkanol amine or an aromatic amine.

3. The improved cathodic electrocoating composition of claim 2 in which the epoxy resin is a poly hydroxy epoxy ether resin and the acid used to neutralize the resin is selected from the group consisting of lactic acid, acetic acid, formic acid sulfamic acid and alkane sulfonic acids.

4. The improved cathodic electrocoating composition of claim 3 in which the poly hydroxy epoxy ether resin is the diglycidyl ether of bisphenol A further reacted with bisphenol A.

5. The improved cathodic electrocoating composition of claim 2 in which the alkanol amine is ethanol amine and the acid is methane sulfonic acid.

6. The improved cathodic electrocoating composition of claim 2 in which the aromatic amine is benzyl amine and the organic acid is methane sulfonic acid.

7. The improved electrocoating composition of claim 2 containing 1–40% by weight, based on the weight of the binder, of a hydroxy functional flexibilizer resin having a weight average molecular weight of about 500–1500.

8. The improved electrocoating composition of claim 7 in which the flexibilizer resin is polytetrahydrofuran having a weight average molecular weight of about 500–1000.

9. A method of preparing a cathodic electrocoating composition comprising the following steps in any workable order:

(a) preparing an epoxy resin-amine adduct reaction product of an epoxy resin and a polyhydric phenol which is chain extended with a primary amine wherein the equivalent amine to epoxy ratio is 1–10 to 4–10 and wherein the epoxy end groups of the resin are reacted with a ketimine and/or a diamine and the resulting chain extended epoxy resin has an epoxy equivalent weight of about 700–2,000;

(b) preparing a blocked polyisocyanate crosslinking agent;

(c) blending the epoxy-resin amine adduct with the blocked polyisocyanate crosslinking agent;

(d) neutralizing the epoxy-resin amine adduct with an organic or inorganic acid and adding water to form an emulsion; and (e) blending the emulsion with a pigment paste to form the cathodic electrocoating composition.

10. The method of claim 9 in which the primary amine is an alkanol amine or an aromatic amine.

11. The method of claim 9 in which the epoxy resin is a poly hydroxy epoxy ether resin.

12. The method of claim 11 in which the poly hydroxy epoxy ether resin is the diglycidyl ether of bisphenol A further reacted with bisphenol A and the acid is methane sulfonic acid.

13. A coated substrate comprising an electrically conductive substrate that has been electrocoated with a layer of the composition of claim 1 which composition has been cured by baking at an elevated temperature.

* * * * *